United States Patent Office 2,998,536
Patented Aug. 29, 1961

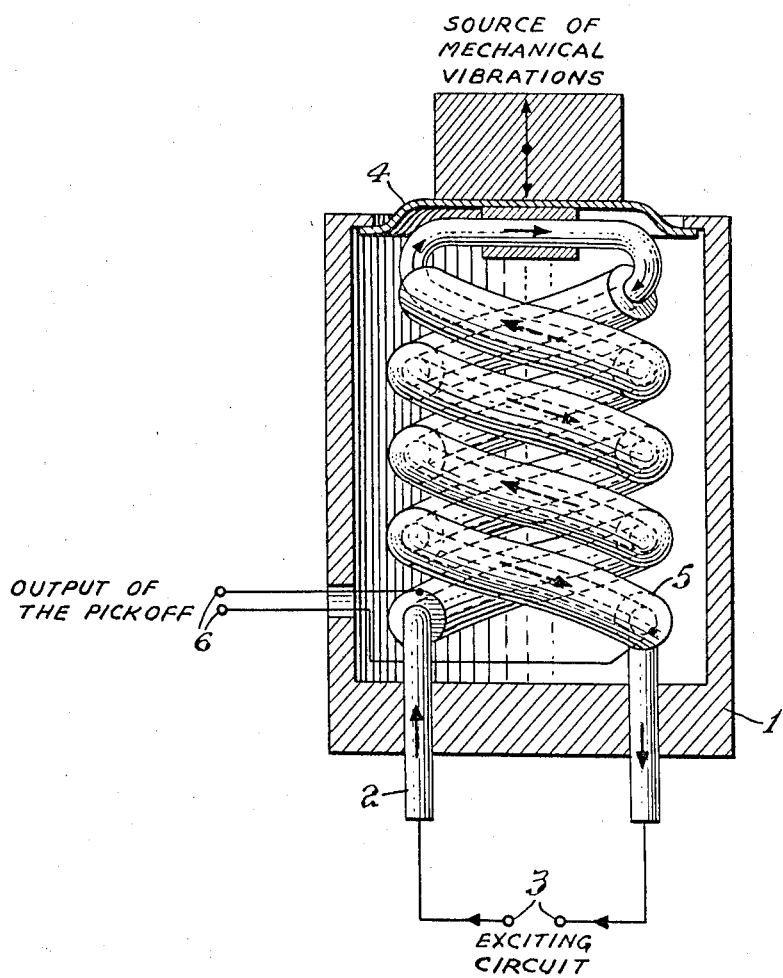

2,998,536
ELECTROMAGNETIC PICK-UP APPARATUS FOR THE RECEPTION OF OSCILLATIONS
Borivoj Dubský and Oldrich Straka, Prague, Czechoslovakia, assignors to Výzkumný a zkušební letecký ústav, Letnany, near Prague, Czechoslovakia
Filed Sept. 26, 1957, Ser. No. 686,390
Claims priority, application Czechoslovakia Oct. 4, 1956
2 Claims. (Cl. 310—15)

The present invention relates to an electromagnetic pick-up apparatus for the reception of oscillations. The new apparatus is based on the utilization of magnetic properties of ferromagnetic materials.

Many types of devices now exist for picking up oscillations and are based on various physical phenomena, such as induction pick-ups, capacity, piezo-electric, magnetostriction, resistance pick-ups and others. The majority of such devices place high requirements on accuracy and material, while yielding a relatively low output, which has to be suitably amplified in amplification stages.

Accordingly, it is an object of the present invention to provide an electromagnetic oscillation pick-up which is very simple, cheap, and places very modest requirements on the manufacture and material, while providing a sufficient output. In accordance with an aspect of the invention, an electromagnetic pick-up comprises substantially a single ferromagnetic torsional rod wound into a two-start or double helix which, is connected in an exciting circuit, and induces an electromotive force in the pick-up circuit, which is proportional to the twist of the torsional rod produced by the source of oscillations. The pick-up circuit may be connected either with a measuring apparatus, or a loud-speaker or with another apparatus for the utilization or transformation of oscillations.

The accompanying drawing represents by way of example an elevational view of an electromagnetic pick-up according to the present invention, but with the casing thereof in section to clearly show the internal structure.

The new electromagnetic pick-up comprises a casing 1, which is open at one end and is secured to a rigid foundation or forms the inertia mass of the pick-up. Within the casing 1 is a torsional body 2 consisting of a single ferromagnetic wire wound in the shape of a two-start or double helix. The two helixes are joined together at the open end of casing 1, and the ends of the torsional body are anchored or secured in the closed end of casing 1. Extending from both ends of the torsional body 2 are terminals 3 which form a part of the exciting circuit. Fixed to the torsional body 2 at the open end of casing 1 is a base 4 which is rigidly connected to the source of oscillations (parts of machines, buildings, vehicles etc.) and the helixes of the torsional body are further surrounded by coils 5 connected to terminals 6.

Direct or alternating current having a frequency several times higher than the highest frequency of the source of oscillations is supplied through the terminals 3 to the torsional body 2 producing thereby a cylindrical magnetic field which is concentric with the longitudinal axis of the wire forming the double helix. Provided a suitable material is used, it is often sufficient to carry out the magnetization with direct current at the beginning only, whereupon the direct current may be interrupted.

The oscillation or vibration of base 4 relative to casing 1 produces a torsional stress in the torsional body 2. These torsional stresses lead to a deformation of the cylindrical magnetic field so as to produce components in the direction of the longitudinal axes of the coils 5, thereby inducing in the coils 5 an electromotive force, which proceeds over the terminals 6 to an indicator or the like. The pick-up circuit may be interchanged with the exciting circuit.

The electromagnetc oscillation pick-up according to the present invention has a wide field of application. It is easy to provide pick-ups of very small dimensions even at inaccessible points, the pick-ups being simple but yielding nevertheless a sufficient undistorted output.

We claim:
1. An electromagnetic oscillation pick-up comprising a casing, a ferro-magnetic torsional body in the form of an elongated rod having its opposite ends secured to said casing and being wound in the form of a double-helix within said casing, an electric exciting circuit connected to said ends of said rod for passing a current along the latter in order to cylindrically magnetize said body, pick-up coils mounted on said double-helix of the rod coaxially with the longitudinal axis of the latter, and a base secured to said rod at the center of the latter and adapted to transmit oscillations to said torsional body so as to deform the cylindrical magnetization of the latter and thereby provide a component of the magnetic field in the direction of said longitudinal axis of the rod for inducing an electromotive force in said pick-up coils.

2. In combination in an electromagnetic pick-up apparatus, an extended ferromagnetic element formed in a double-helix configuration, means for cylindrically magnetizing said element, pick-up means disposed about a portion of said element so as to be normally essentially parallel to the cylindrical magnetic field about said element, and means for torsionally deflecting said ferromagnetic element and changing said cylindrical magnetic field to a helical magnetic field thereby establishing components of the magnetic field in orthogonal relationship with said pick-up means, whereby a voltage is induced in said pick-up means which is proportional to the torsional deformation of said ferromagnetic element.

References Cited in the file of this patent
UNITED STATES PATENTS

| | | |
|---|---|---|
| 1,270,920 | Botz | July 2, 1918 |
| 2,511,178 | Roters | June 13, 1950 |
| 2,557,393 | Rifenbergh | June 19, 1951 |
| 2,838,007 | Johnston | June 10, 1958 |